United States Patent

[11] 3,594,515

[72] Inventor Ronald Ernest Charles Brown
Orpington, England

[21] Appl. No. 744,430
[22] Filed July 12, 1968
[45] Patented July 20, 1971
[73] Assignee Associated Electrical Industries Limited
London, England
[32] Priority July 12, 1967
[33] Great Britain
[31] 32021/67

[54] SOUND REFLECTING TELEPHONE CASING
3 Claims, 7 Drawing Figs.

[52] U.S. Cl. .......... 179/100, 179/84 T
[51] Int. Cl. .......... H04m 1/02
[50] Field of Search .......... 179/100 L, 147, 179, 178, 84 T, 81 B, 100, 100 D, 146

[56] References Cited

UNITED STATES PATENTS

| | | | |
|---|---|---|---|
| 2,392,321 | 1/1946 | Hersey | 179/84 (TR) |
| 2,699,469 | 1/1955 | Thomas et al. | 179/179 |
| 2,972,021 | 2/1961 | Bryant et al. | 179/84 (TR) |
| 3,073,911 | 1/1963 | Mattke et al. | 179/179 |
| 3,459,899 | 8/1969 | Lane et al. | 179/81 (B) |
| 2,850,583 | 9/1958 | Robinson et al. | 179/147 |

FOREIGN PATENTS

| | | | |
|---|---|---|---|
| 1,058,562 | 6/1959 | Germany | 179/100 |

*Primary Examiner*—Kathleen H. Claffy
*Assistant Examiner*—Randall P. Myers
*Attorney*—Larson, Taylor and Hinds

ABSTRACT: A telephone instrument in which either the microphone or the receiver transducer is used in the "on-hook" condition to emit tone calling signals. The instrument casing is shaped to provide recesses for the microphone and receiver housings such as to define, with the housing of the tone-emitting transducer, a cavity which provides acoustic enhancement of the emitted tone. The transistor amplifier within the casing is connected to act as an oscillator to generate the calling tone in the "on-hook" condition and as a speech current amplifier in the "off-hook" condition.

SOUND REFLECTING TELEPHONE CASING

This invention relates to telephone instruments and in particular to the well-known type of such instrument comprising a handset having a transducer acting as a microphone accommodated in a housing at one end, a transducer acting as a receiver accommodated in a housing at the other end, and a handgrip portion extending between the microphone and receiver housings, the handset being adapted to lie on the casing of the instrument in a normal or so-called "on-hook" position in which its handgrip portion urges against and thereby operates a gravity switch of the instrument.

According to the present invention there is provided a telephone instrument of the above type in which either the microphone or the receiver is used to produce tone calling signals and which has its casing formed with a recess in which the housing of the transducer used for tone calling is located when the handset lies on said casing in said normal position, said housing and the walls of the recess defining a cavity which provides acoustic enhancement of the tone calling signals.

The recess may be so shaped and dimensioned relative to the shape and dimensions of the respective housing that when the housing is located in the recess its front face is spaced from the base of the recess over a substantial portion of its surface area so as to form an air cavity which is open to the external atmosphere between the outer end of the housing and the casing and which forms a resonant cavity capable of enhancing a tone calling signal produced by the transducer.

It has been found that what are possibly the best results regarding overall acoustic enhancement and sound distribution can be obtained when the face of the respective housing and the general plane of the base of the recess are at an acute angle to one another. However, satisfactory results can also be obtained with the face of the said housing lying substantially parallel to the base of the recess, provided a suitable airgap exists between the face and base.

Preferably, the instrument casing is also formed with a second recess in which the housing for the other transducer of the handset is located when the latter lies on said casing in said normal position. The shape and dimensioning of this second recess may also be such relative to the shape and dimensions of the housing for the tone calling transducer that if the handset of the instrument is replaced the "wrong way round" in the normal position, the latter housing will be at least partially located in said second recess and some acoustic enhancement of the tone calling signals will be obtained.

This second recess may have inwardly sloping and rounded sidewalls to provide a "walk-home" effect whereby if the handset is carelessly replaced askew of the casing in the normal position, that part of the handset which is in engagement with the inwardly sloping and rounded sidewalls will tend to slide so that the handset will tend to align itself centrally of the instrument casing.

In order that the invention may be more fully understood reference will now be made by way of example to the accompanying drawings of which:

Figure 1:
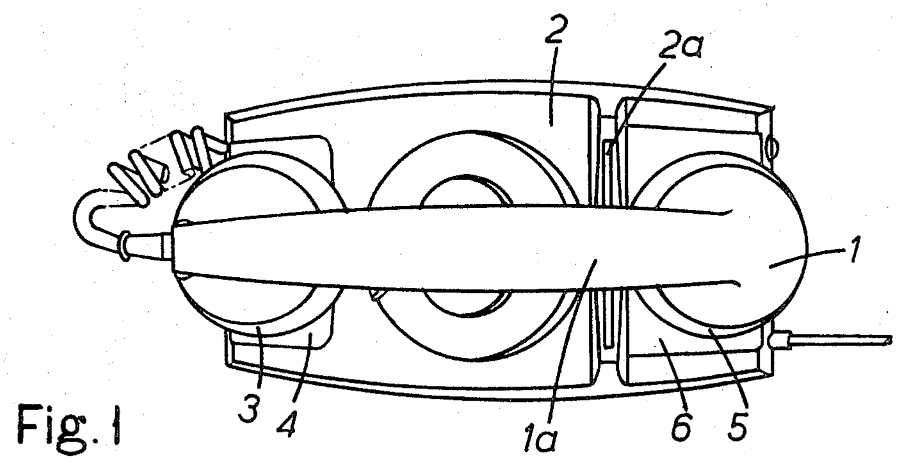
FIGS. 1 and 2 are plan views of a telephone instrument according to the invention.
Figure 3:
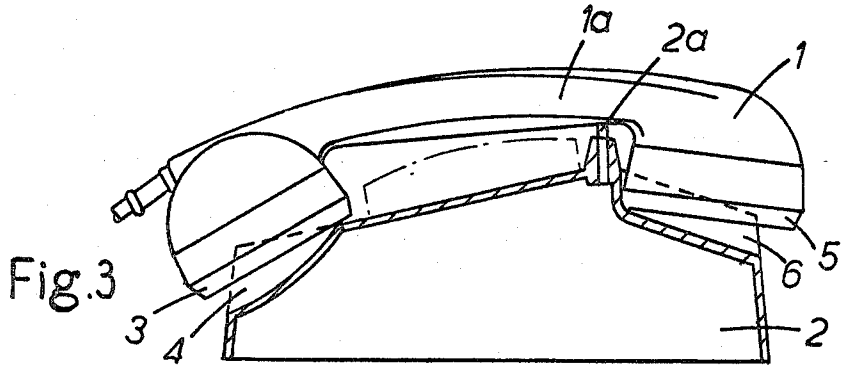
FIGS. 3 and 4 are part-sectional side views of FIGS. 1 and 2 respectively.
Figure 5:
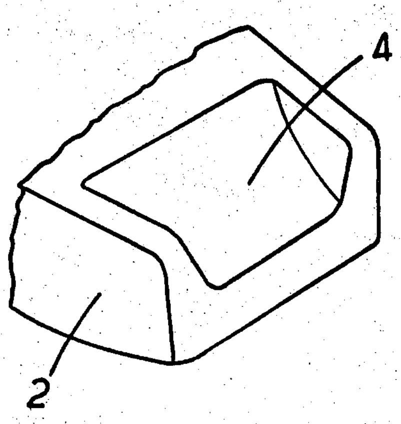
FIGS. 5 and 6 are respective fragmentary perspective views of two recesses formed in the casing of the telephone instrument shown in FIGS. 1 to 4.
Figure 6:
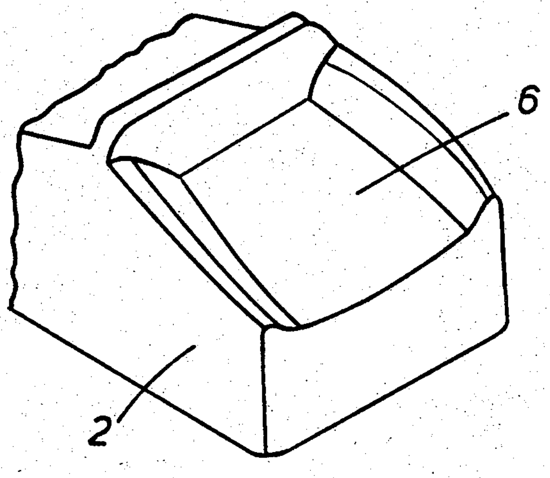

Referring to the drawings, in FIGS. 1 and 3 the handset 1 of the telephone instrument is positioned the correct way round in the "on-hook" or normal position on the instrument casing 2. In this position, the handgrip portion 1*a* of the handset 1 urges against a rectangular shaped gravity switch operating member 2*a*, thereby displacing this member 2*a* and so operating the gravity switch of the instrument. Also, with the handset 1 the correct way round, a transmitter housing 3 of the handset 1 is located in a first recess 4 formed in the instrument casing 2, while the receiver housing 5 of the handset 1 is located in a second recess 6. These two recesses 4 and 6 are also shown in FIGS. 5 and 6 respectively. As seen in FIG. 3, the relative shaping and dimensioning of the transmitter housing 3 and the recess 4 are such that an air cavity is formed between the face of the transmitter housing and the base of the recess 4, this air cavity being open to the external atmosphere between the outer end of the transmitter housing 3 and the casing 2. This air cavity forms a resonant cavity capable of enhancing a tone calling signal produced by the transmitter.

Figure 2:
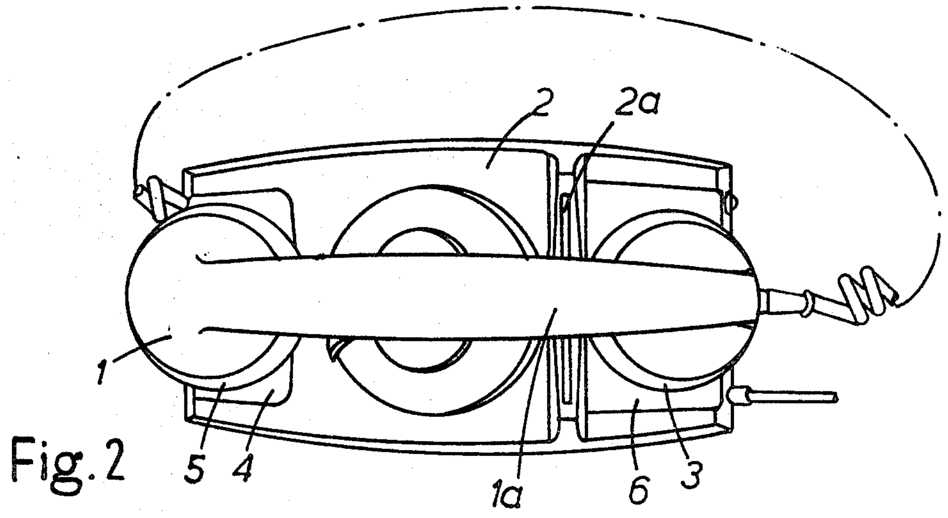
Figure 4:
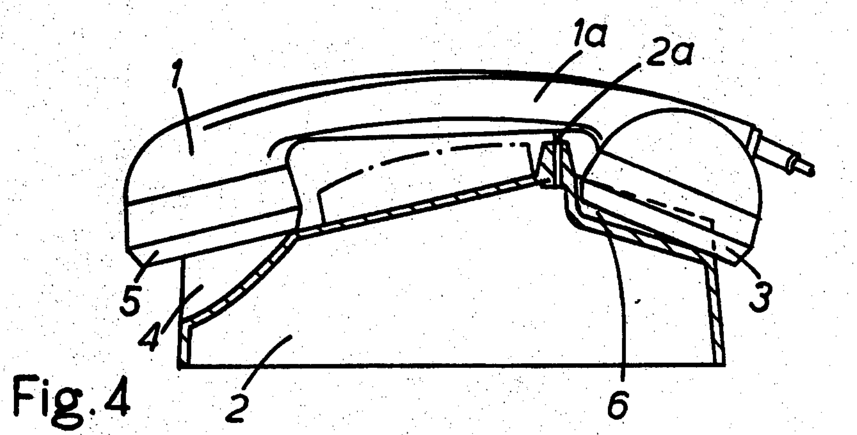

If, as shown in FIGS. 2 and 4, the handset 1 is placed on the instrument casing 2 the wrong way round, then the transmitter housing 3 is located in the recess 6 and the receiver housing 5 is located in the recess 4. In this instance acoustic enhancement of a tone calling signal produced by the transmitter is as great as when the handset is the correct way around.

As shown more clearly in FIG. 6, the recess 6 has inwardly sloping and rounded sidewalls. These walls provide a "walk-home" effect whereby if the handset 1 is replaced carelessly askew of the casing 2 in the normal position, that part of the handset 1 which is in engagement with these inwardly sloping and rounded sidewalls will tend to slide so that the handset 1 will tend to align itself centrally of the instrument casing 2.

It is mentioned that a feature of the design of the instrument casing and handset as shown in the drawings, is that if the handset is replaced in an incorrect position with one end of the handset actually resting on a surface beside the instrument casing, the handset will either still engage with the member 2*a* to operate the gravity switch of the instrument or will simply fall away from the casing, depending on the actual (incorrect) position in which it is replaced; this is due to the relative dimensions of the handset 1 and instrument casing 2. However, it will be evident that if the handset 1 is replaced in such an incorrect position, there will be little or no acoustic enhancement of a tone calling signal produced by the transmitter.

It will be evident that the invention could also be applied in the case where the receiver of the handset, instead of the transmitter, is used to produce tone calling signals.

In the telephone instrument shown in the drawings the face of the transmitter housing 3 and the base of the recess, in the normal position of the handset, extend at an angle of approximately 10° to one another, the gap at the front edge of the cavity being approximately one-fourth of an inch. When the handset is replaced the wrong way round, as shown in FIGS. 2 and 4, the face of the transmitter housing 3 and the base of the recess 6 extend at an angle of approximately 5° to one another.

Figure 7:
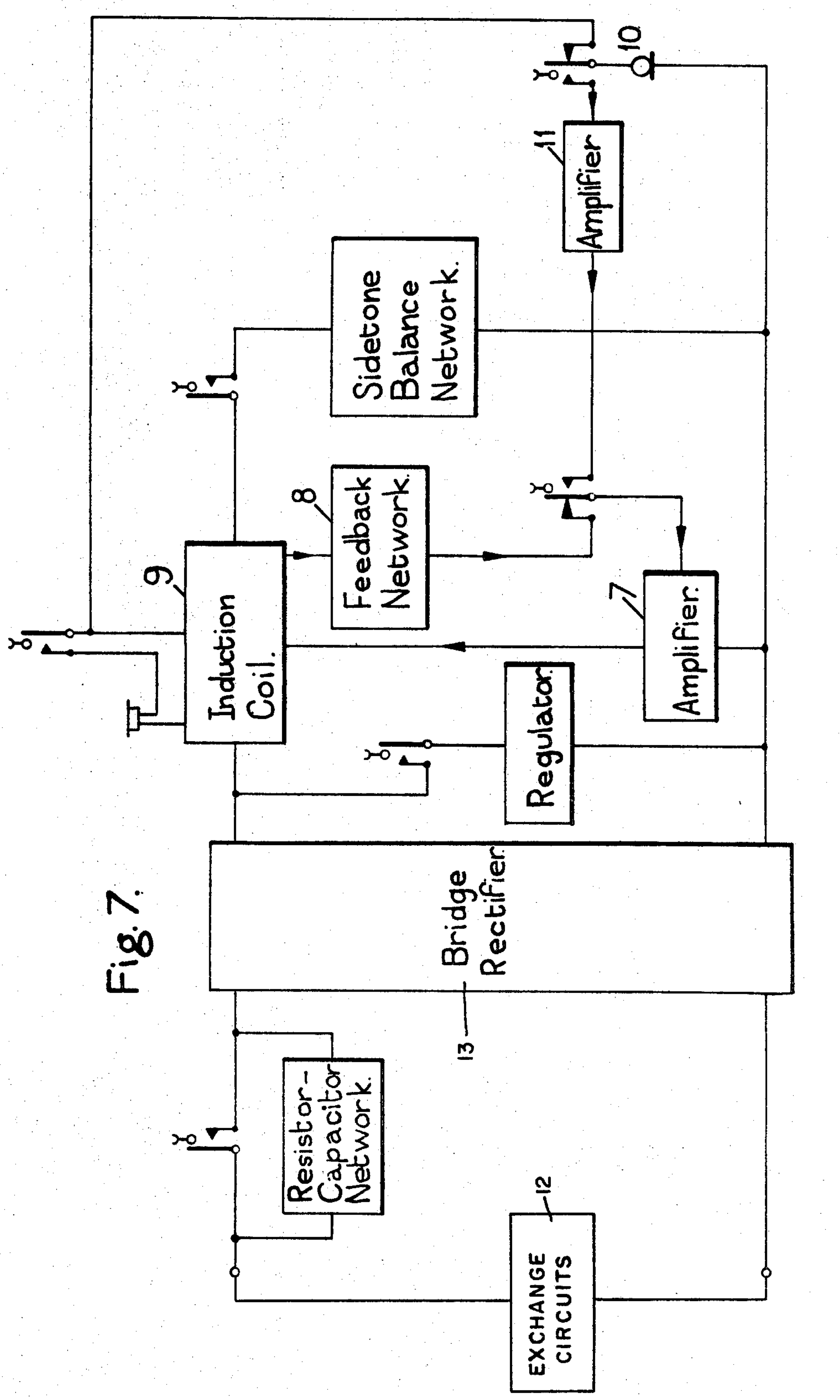
FIG. 7 shows schematically the electric circuit of the instrument.

Referring to FIG. 7, the calling tone of say 2.7 kilohertz is generated by a transistor oscillator comprising an amplifier 7 and a feedback network 8, and in the on-hook condition this calling tone is applied by way of the induction coil 9 to the microphone 10 of the handset 1. In order that it may function both as a microphone and as a tone emitter, an electrodynamic microphone, for example a rocking armature or a moving coil microphone, is used. The amplifier 7 together with a further amplifier 11, is utilized in the off-hook condition to amplify speech currents from the microphone 10. The changeover of function of the microphone 10 and amplifier 7 is achieved by means of hook switch contacts. Calling signals from conventional exchange circuits 12 are rectified by a bridge rectifier 13 for energizing the amplifier 7 whereby the calling tone is generated.

I claim:

1. A telephone instrument comprising a base including casing and a handset which in the on-hook condition rests on said casing and which includes a microphone transducer and microphone housing, a receiver transducer and receiver housing and a handgrip portion extending between said housings, speech signal amplifier means mounted within said casing, means for connecting said amplifier means, in the on-hook condition, in an oscillatory circuit arranged to supply an oscillatory signal to one of said transducers, means for energizing said oscillatory circuit in dependence upon signals received by said instrument, said oscillatory signal being emitted by said one transducer as a tone calling signal, and means for providing acoustic enhancement of said tone calling signal, said acoustic enhancement providing means including a recess in said casing for defining, in the on-hook condition, a substantially wedge-shaped cavity between the housing of said one of said transducers and said casing.

2. A telephone instrument in accordance with claim 1 wherein the casing is formed with a second recess in which the housing of the other transducer of the handset is located when the handset rests on said casing in the normal position, this second recess being so shaped that if the handset is placed the wrong way round on the casing acoustic enhancement of tone calling signals is again provided.

3. A telephone instrument in accordance with claim 2 wherein the second recess has inwardly sloping and rounded sidewalls such that if the handset is placed askew on the casing that part of the handset which is in engagement with said sidewalls will tend to slide so that the handset will tend to align itself centrally on the instrument casing.